(12) United States Patent
Watanabe

(10) Patent No.: US 7,703,955 B2
(45) Date of Patent: Apr. 27, 2010

(54) VEHICULAR ILLUMINATION SYSTEM

(75) Inventor: Shinya Watanabe, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 203 days.

(21) Appl. No.: 11/987,201

(22) Filed: Nov. 28, 2007

(65) Prior Publication Data
US 2008/0130302 A1 Jun. 5, 2008

(30) Foreign Application Priority Data
Dec. 1, 2006 (JP) ............... 2006-326178

(51) Int. Cl.
*B60Q 1/06* (2006.01)
*B60Q 1/08* (2006.01)
(52) U.S. Cl. ............... 362/466; 362/464; 362/465; 701/49
(58) Field of Classification Search ......... 362/464–466; 701/49
See application file for complete search history.

(56) References Cited

U.S. PATENT DOCUMENTS

| 6,459,387 B1 | 10/2002 | Kobayashi et al. | |
| 6,481,876 B2 * | 11/2002 | Hayami et al. | ............... 362/464 |
| 6,817,740 B2 * | 11/2004 | Kobayashi et al. | ........... 362/466 |
| 2008/0101077 A1 * | 5/2008 | Watanabe | ................... 362/466 |

FOREIGN PATENT DOCUMENTS

| DE | 100 50 741 A 1 | 4/2001 |
| JP | 7-69125 | 3/1995 |
| JP | 9-301055 | 11/1997 |
| JP | 2002-178828 | 6/2002 |
| JP | 2003-159985 | 6/2003 |
| JP | 2003-267125 | 9/2003 |
| JP | 2004-352246 | 12/2004 |
| JP | 2005-262937 | 9/2005 |
| JP | 2006-21631 | 1/2006 |

OTHER PUBLICATIONS

Office Action issued Sep. 21, 2009, in German Appln. No. 10 2007 057 316.4-56, Yes.
Japanese Office Action dated Nov. 4, 2008.

* cited by examiner

Primary Examiner—Stephen F Husar
Assistant Examiner—James W Cranson
(74) Attorney, Agent, or Firm—Finnegan, Henderson, Farabow, Garrett & Dunner, LLP

(57) ABSTRACT

A vehicular illumination system includes a vehicular illumination unit whose light distribution is changeable, a detection unit that detects an illumination target, and an acquisition unit that acquires load information representing a processing load when processing is performed to controls the light distribution of the vehicular illumination unit based on the relative displacement between the subject vehicle and the illumination target detected by the detection unit. Further, the vehicular illumination system includes a control unit that is capable of plural types of light distribution control, in each of which the processing load is different, and that controls the light distribution of the vehicular illumination unit by the light distribution control of a load corresponding to the processing load that is represented by the load information acquired by the acquisition unit.

5 Claims, 13 Drawing Sheets

| HEADLIGHT DIVIDED REGION NO. | LED LIGHT SOURCE NO. |
|---|---|
| 1 | 1~8 |
| 2 | 9~12 |
| 3 | 13~15 |
| 4 | 16 |
| 5 | 17 |
| 6 | 18, 19 |
| 7 | 20~22 |
| 8 | 23~27 |

POSITION $A_0$ AND TIME $t_0$ WHEN INTERSECTION IS ENTERED

POSITION WHERE LIGHT IS TURNED OFF $\theta_0 = -\tan^{-1}(X_0/Y_0)$

POSITION $A_1$ AND TIME $t_0 + L/a$ WHEN INTERSECTION IS ENTERED

POSITION WHERE LIGHT IS TURNED OFF $\theta_2 = \Delta\theta - \tan^{-1}((X_0 - \Delta X - XbL/a)/(Y_0 - \Delta Y - YbL/a))$ POSITION $A_0$ AND TIME $t_0$ WHEN INTERSECTION IS ENTERED POSITION WHERE LIGHT IS TURNED OFF $\theta_0 = -\tan^{-1}(X_0 - Y_0)$ POSITION $A_1$ AND TIME $t_0 + L/a$ WHEN ENTERING INTERSECTION POSITION WHERE LIGHT IS TURNED OFF $\theta_2 = \Delta\theta - \tan^{-1}((X_0 - \Delta X)/(Y_0 - \Delta Y))$ POSITION $A_0$ AND TIME $t_0$ WHEN INTERSECTION IS ENTERED POSITION WHERE LIGHT IS TURNED OFF $\theta_0 = -\tan^{-1}(X_0 - Y_0)$ POSITION $A_1$ AND TIME $t_0 + L/a$ WHEN INTERSECTION IS ENTERED POSITION WHERE LIGHT IS TURNED OFF $\theta_2 = \Delta\theta - \tan^{-1}((X_0 - \Delta X - bL/a)/(Y_0 - \Delta Y))$

VEHICULAR ILLUMINATION SYSTEM

CROSS-REFERENCE TO RELATED APPLICATION

This application claims priority under 35 USC 119 from Japanese Patent Application No. 2006-326178, the disclosure of which is incorporated by reference herein.

BACKGROUND

1. Technical Field

The present invention relates to a vehicular illumination system, and in particular to a vehicular illumination system that controls the distribution of light emitted from headlights or the like.

2. Related Art

As a vehicular illumination system that controls the light distribution of headlights or the like, the technology described in Japanese Patent Application Laid-Open (JP-A) No. 2006-21631, for example, has been proposed.

In the technology described in JP-A No. 2006-21631, it is proposed to provide: plural light sources that illuminate respectively different regions to form a predetermined overall light distribution pattern including a main light distribution portion and a peripheral light distribution portion; a camera that images the front of a vehicle; a dangerous object determination component that determines whether or not an object is a dangerous object that poses a danger to the travel of the vehicle on the basis of the image acquired by the camera; and a light source control component that changes the orientations of the plural light sources to illuminate the dangerous object when the dangerous object so determined by the dangerous object determination component is located outside the main light distribution portion. That is, in the technology described in JP-A No. 2006-21631, what is proposed is to perceive a target object around the subject vehicle by photographing the target object with a camera and performing light distribution control, such as directing light axes, with respect to the recognized target object.

However, in the technology described in JP-A No. 2006-21631, when there are many target objects, or when the situation around the subject vehicle changes rapidly such as when approaching an intersection, the processing load of image processing and the like with respect to the image photographed by the camera rises, and there is the potential for this to cause delays in control. Accordingly, there remains scope for further improvements in control.

SUMMARY

The present invention has been made in view of these circumstances, and it is an object thereof to reduce the processing load and curb control delay.

A first aspect of the invention provides a vehicular illumination system comprising: a vehicular illumination unit whose light distribution is changeable; a detection unit that detects an illumination target; an acquisition unit that acquires load information representing a processing load when performing processing to control the light distribution of the vehicular illumination unit based on a relative displacement between a subject vehicle and the illumination target detected by the detection unit; and a control unit that is capable of plural types of light distribution control, in each of which the processing load is different, and that controls the light distribution of the vehicular illumination unit according to light distribution control of a load corresponding to the processing load that is represented by the load information acquired by the acquisition unit.

According to the first aspect of the invention, the light distribution of the vehicular illumination unit is capable of being changed. Headlights for a vehicle, for example, can be applied as the vehicular illumination unit. Further, it is possible to apply, as the vehicular illumination unit, a unit whose light distribution is capable of being changed by controlling the lighting of each light source of a light source array where light sources such as LED light sources whose lighting and extinguishment are capable of being independently controlled, a unit whose light distribution is capable of being changed by using a spatial light modulator such as a digital micromirror device (DMD) or a liquid crystal element that reflects light from a light source, or a unit whose light distribution is capable of being modulated by using a shutter or the like.

In the detection unit, the illumination target is detected. A camera or the like, for example, can be applied as the detection unit so that an illumination target such as another vehicle or a pedestrian can be detected by the camera or the like. Further, when the detection unit is to detect another vehicle, it is possible for the detection unit to easily detect another vehicle by detecting the bright point of the other vehicle.

In the acquisition unit, load information representing a processing load when performing processing to control the light distribution of the vehicular illumination unit on the basis of the relative displacement between the subject vehicle and the illumination target is acquired when the illumination target is detected by the detection unit. For example, the acquisition unit may be configured to acquire, as the load information, at least one of information representing the steering angle, information representing the number of illumination targets, and information representing the road environment such as the road shape.

Further, the control unit is capable of plural types of light distribution control whose processing loads are respectively different, and the light distribution of the vehicular illumination unit is controlled by the light distribution control of a load corresponding to the processing load that the load information acquired by the acquisition unit represents, that is, light distribution control of a load corresponding to the processing load is performed. Thus, for example, when the processing load is equal to or greater than a predetermined processing load, the control unit can switch to the light distribution control of the plural types of light distribution control processing whose processing load is low, and can reduce the processing load and curb control delay.

A second aspect of the invention provides a vehicular illumination system comprising: a vehicular illumination unit whose light distribution is changeable; a detection unit that detects an illumination target; an acquisition unit that acquires a detection result of a steering angle of a subject vehicle; and a control unit that is capable of plural types of light distribution control in each of which a processing load, when performing processing to control the light distribution of the vehicular illumination unit based on a relative displacement between the subject vehicle and the illumination target detected by the detection unit, is different, and that controls the light distribution of the vehicular illumination unit according to light distribution control of a load corresponding to the steering angle acquired by the acquisition unit.

According to the second aspect of the invention, the light distribution of the vehicular illumination unit is capable of being changed. Headlights for a vehicle, for example, can be applied as the vehicular illumination unit. Further, it is possible to apply, as the vehicular illumination unit, a unit whose light distribution is capable of being changed by controlling the lighting of each light source of a light source array where light sources such as LED light sources whose lighting and extinguishment are capable of being independently controlled, a unit whose light distribution is capable of being changed by using a spatial light modulator such as a digital micromirror device (DMD) or a liquid crystal element that reflects light from a light source, or a unit whose light distribution is capable of being modulated by using a shutter or the like.

In the detection unit, an illumination target is detected. A camera or the like, for example, can be applied as the detection unit so that an illumination target such as another vehicle or a pedestrian can be detected by the camera or the like. Further, when the detection unit is to detect another vehicle, it is possible for the detection unit to easily detect another vehicle by detecting the bright point of the other vehicle.

In the acquisition unit, the detection result of the steering angle of the subject vehicle is acquired. For example, the detection result of the steering angle detected by a steering angle sensor disposed in the vehicle is acquired.

Further, the control unit is capable of plural types of light distribution control in each of which a processing load, when processing is performed to control the light distribution of the vehicular illumination unit based on a relative displacement between a subject vehicle and the illumination target detected by the detection unit, is different, and the light distribution of the vehicular illumination unit is controlled according to light distribution control of a load corresponding to the steering angle acquired by the acquisition unit.

That is, when the steering angle of the subject vehicle becomes larger, the relative displacement between the subject vehicle and the illumination target becomes larger, whereby the processing load of the light distribution control processing becomes higher. Thus, because the light distribution control of a load corresponding to the steering angle is performed, the control unit can switch to the light distribution control of the plural types of light distribution control processing whose processing load is low, such as when the detection result of a steering angle equal to or greater than a predetermined angle is acquired, and can reduce the processing load and curb control delay.

It will be noted that the control unit may be configured to be capable of two types of the light distribution control and control the light distribution of the vehicular illumination unit by the light distribution control whose processing load is lower when the acquisition result of the acquisition unit is equal to or greater than a predetermined value.

Further, at least one of information representing the steering angle, information representing the number of illumination targets, and information representing the road environment can be applied as the load information.

Further, the plural types of light distribution control processing may include predictive light distribution control that uses the detection result of the detection unit as a reference to predict the relative displacement between the subject vehicle and the illumination target and control the light distribution of the vehicular illumination unit on the basis of the prediction result. When the plural types of light distribution control include predictive light distribution control in this manner, the vehicular illumination system predicts the relative displacement between the subject vehicle and the illumination target, so the processing load can be made lower than when the vehicular illumination system always detects an illumination target and calculates the relative displacement.

Further, when the detection unit is to detect another vehicle as the illumination target, the predictive light distribution control may determine, on the basis of the detection result of the detection unit and an acquisition result of an information acquisition unit that acquires map information and the traveling status of the subject vehicle, the right/left turn status of the subject vehicle into an intersection where there is a signal, the presence of another vehicle in front of the right/left turn, and the status of the signal facing the subject vehicle, and when the signal facing the subject vehicle allows entry, the predictive light distribution control may use 0 as the moving displacement of the other vehicle to predict the relative displacement. That is, when the signal of the subject vehicle allows entry, it can be predicted that there is a high probability that the signal facing the other vehicle in front of the right/left turn prohibits entry and that the other vehicle is stopped, and the processing load can be reduced in comparison to when the vehicular illumination system detects the actual moving displacement of the other vehicle and calculates the relative displacement.

Further, when the detection unit is to detect another vehicle as the illumination target, the predictive light distribution control may predict the relative displacement on the basis of the detection result of the detection unit and an acquisition result of an information acquisition unit that acquires map information including the road shape. For example, the vehicular illumination system can acquire the road shape from a navigation device or the like and predict the relative displacement between the subject vehicle and another vehicle, so the processing load can be reduced over when the vehicular illumination system always detects another vehicle and calculates the relative displacement.

Further, the plural types of light distribution control may include light distribution control that prohibits processing to control the light distribution on the basis of the relative displacement between the illumination target and the subject vehicle when the acquisition result of the acquisition unit is equal to or greater than a predetermined value. When the light distribution control is prohibited in this manner, unnecessary control resulting from control delay can be curbed.

Moreover, the plural types of light distribution control may include high beam light distribution control that controls the light distribution of a high beam region on the basis of the relative displacement between the subject vehicle and the illumination target and low beam light distribution control that prohibits the light distribution of the high beam region of the high beam light distribution control and emits light only to a low beam region. Thus, even when the processing load increases and the high beam light distribution control is switched to the low beam light distribution control, the necessary minimum illumination can be ensured.

Further, the vehicular illumination unit may be configured so as to be capable of having its light distribution changed for each divided region of a plurally divided light distribution region. Further, the light distribution control processing may control the light distribution of the vehicular illumination unit such that the light emitted towards the divided region corresponding to the illumination target detected by the detection unit is not emitted or is dimmed.

As will be understood from the preceding description, according to the present invention, excellent action and effects are obtained in that the processing load can be reduced and control delay can be curbed because light distribution control of a load corresponding to the processing load is performed.

DETAILED DESCRIPTION

Figure 1:
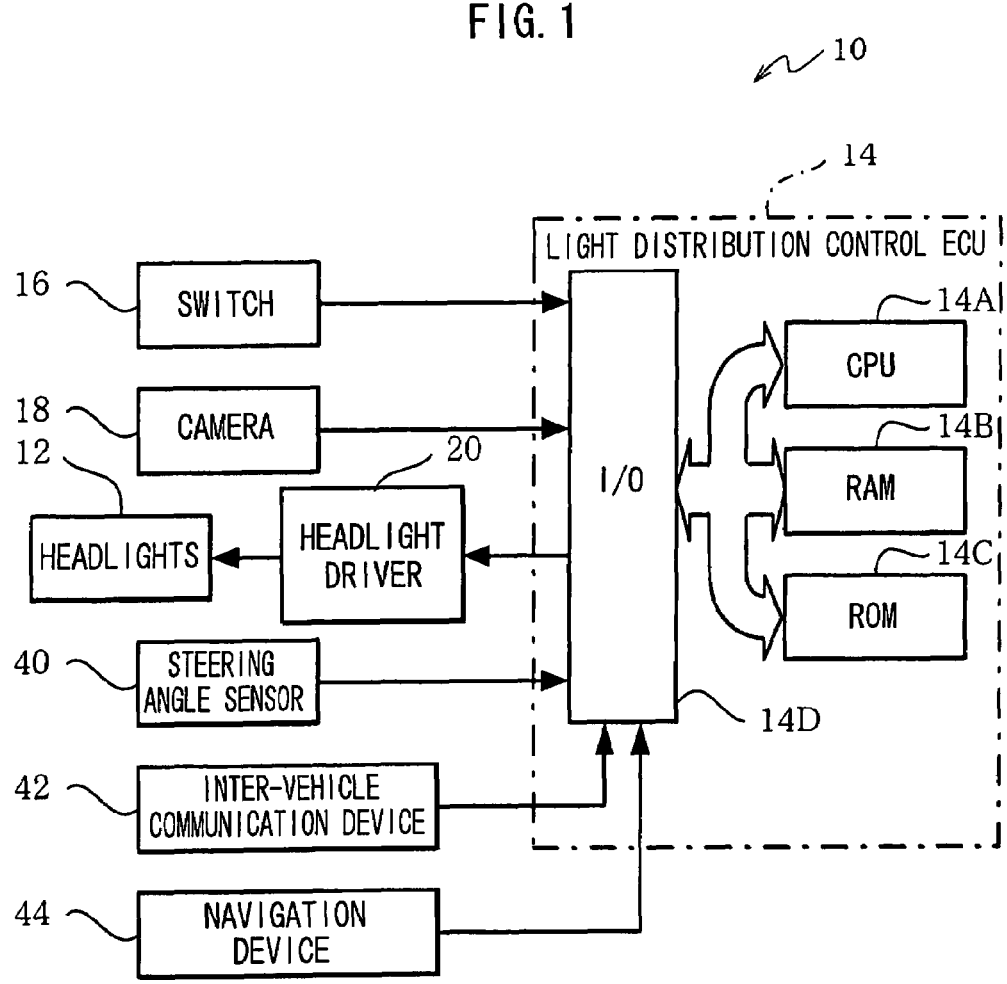
FIG. 1 is a block diagram showing the configuration of a vehicular illumination system pertaining to an embodiment of the present invention.

An example of an embodiment of the present invention will be described in detail below with reference to the drawings. FIG. 1 is a block diagram showing the configuration of a vehicular illumination system 10 pertaining to an embodiment of the present invention.

In the vehicular illumination system 10 pertaining to the embodiment of the present invention, as shown in FIG. 1, front headlights 12 disposed in a vehicle are connected to a light distribution control ECU 14, and the lighting and extinguishment of the headlights 12 is controlled by the light distribution control ECU 14.

In the present embodiment, the light distribution control ECU 14 performs light distribution control so as to extinguish a region of light distribution regions of the headlights 12 that corresponds to another vehicle, such as an oncoming vehicle in front.

The light distribution control ECU 14 is configured by a microcomputer that includes a CPU 14A, a RAM 14B, a ROM 14C and an I/O 14D.

A table for performing control of the light distribution of the headlights 12 and a program for executing a later-described light distribution control routine are stored in the ROM 14C of the light distribution control ECU 14, and the RAM 14B is used as a memory and the like that performs various types of calculations and the like performed by the CPU 14A.

A switch 16, a camera 18, a headlight driver 20, a steering angle sensor 40, an inter-vehicle communication device 42 and a navigation device 44 are connected to the I/O 14D, and the operating status of the switch 16, the result of photographing the front of the vehicle by the camera 18, the detection result of the steering angle sensor 40 (the steering angle detected by the steering angle sensor 40), and communication information resulting from the inter-vehicle communication device 42 are inputted to the light distribution control ECU 14.

The switch 16 instructs the switching ON and OFF of the headlights 12, and also instructs low beams and high beams and outputs the instruction result to the light distribution control ECU 14. Further, the camera 18 photographs the front of the vehicle and outputs the photographed result to the light distribution control ECU 14.

Additionally, the light distribution control ECU 14 controls the headlight driver 20 in accordance with the status of the switch 16 to light the headlights 12, and also controls the light distribution of the headlights 12 such that the light from the headlights 12 is not emitted towards a region corresponding to an oncoming vehicle.

Further, the control of the light distribution of the headlights 12 by the light distribution control ECU 14 includes: first light distribution control (sometimes called "photographic image light distribution control" below) that detects an oncoming vehicle on the basis of the image photographed by the camera 18, identifies a region corresponding to the oncoming vehicle, and controls the light distribution of the headlights 12 such that the light from the headlights 12 is not emitted towards the region corresponding to the oncoming vehicle; and second light distribution control (sometimes called "predictive light distribution control" below) that predicts a change in the vehicle angle on the basis of position information of the subject vehicle obtained from the navigation device 44 and the vehicle speed and position information of an oncoming vehicle obtained by the inter-vehicle communication device 42, identifies a region corresponding to the oncoming vehicle, and controls the light distribution of the headlights 12 such that the light from the headlights 12 is not emitted towards the region corresponding to the oncoming vehicle. It will be noted that in the present embodiment, the light distribution control ECU 14 controls the light distribution such that the from the headlights 12 is not emitted towards a divided region in which an oncoming vehicle is present, but the light distribution control ECU 14 may also be configured to control the light distribution such that the light from the headlights 12 is dimmed rather than not being emitted.

Incidentally, when the steering angle becomes larger, such as when turning at an intersection or the like, the movement of an oncoming vehicle in the vehicle width direction with respect to the subject vehicle becomes larger, so the processing load of image processing and the like when detecting an oncoming vehicle from the photographed image increases, and so control delay ends up occurring in the first light distribution control. Thus, the light distribution control ECU 14 is configured to perform the first light distribution control until the steering angle becomes a predetermined angle and perform the second light distribution control, whose processing load is lower than that of the first light distribution control, when the steering angle becomes equal to or greater than the predetermined angle such as when the processing load increases.

Figure 2:
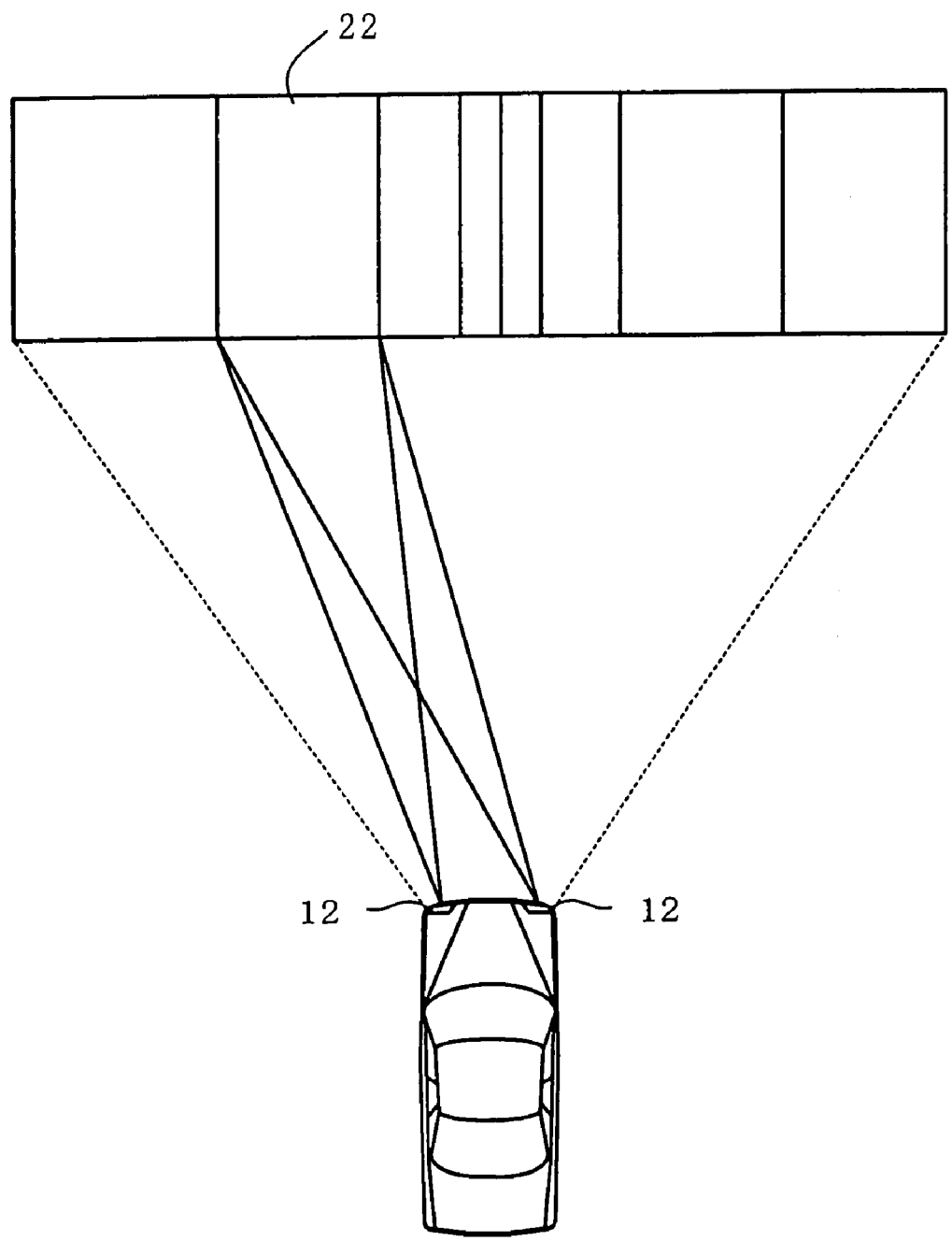
FIG. 2 is a diagram for describing divided regions of a light distribution range of headlights of the vehicular illumination system pertaining to an embodiment of the present invention.

Two of the headlights 12 are disposed in the front end portion of the vehicle. As shown in FIG. 2, the light distribution region of the headlights 12 is plurally divided in the vehicle width direction into divided regions 22, and the headlights 12 are made capable of emitting or not emitting the light with respect to each of the divided regions 22, whereby the light distribution is capable of being changed for each of the divided regions 22, and the emission and non-emission of the light towards each of the divided regions 22 is controlled by the light distribution control ECU 14.

Figure 3A:
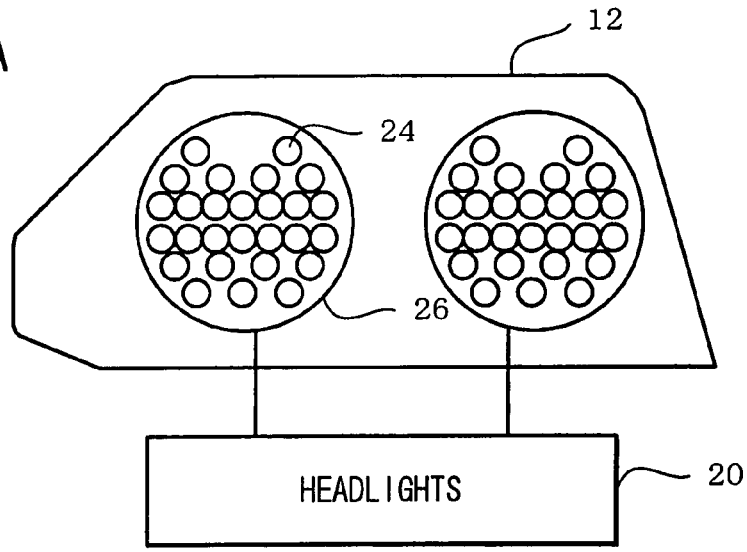
FIGS. 3A to 3C are diagrams showing examples of headlights capable of being applied to the vehicular illumination system pertaining to an embodiment of the present invention.
Figure 3B:
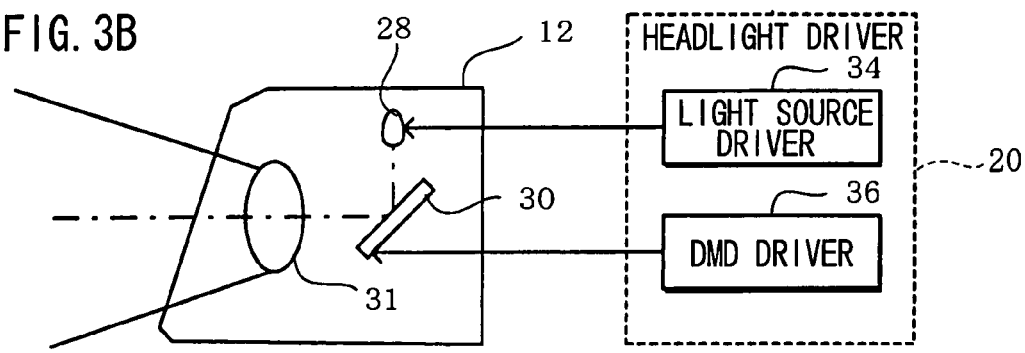

FIGS. 3A and 3B are diagrams showing examples of headlights capable of being applied to the vehicular illumination system 10 pertaining to the embodiment of the present invention.

For example, as shown in FIG. 3A, headlights including plural LED light sources 24 may be applied as the headlights 12. The headlight driver 20 controls the lighting and extinguishment of the plural LED light sources 24 so that it is possible for the headlights 12 to emit or not emit the light towards each of the divided regions 22 shown in FIG. 2. FIG. 3A shows an example of a headlight disposed with two LED lamps 26, each of which is disposed with the plural LED light sources 24. The headlight here may be configured such that one of the LED lamps 26 is used for a low beam and the other of the LED lamps 26 is used for a high beam.

Figure 3C:
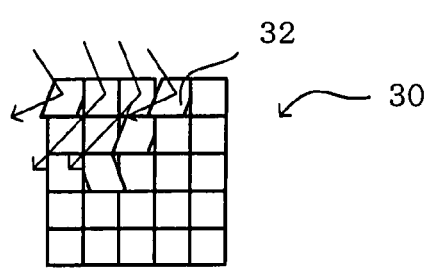

Further, as shown in FIG. 3B, headlights that use a digital micromirror device (DMD) 30 to reflect light from one light source 28 and irradiate the front of the vehicle via a lens 31 may also be applied as the headlights 12. As shown in FIG. 3C, the DMD 30 is a device disposed with plural micromirrors 32 where the rotation of each of the micromirrors 32 is capable of being controlled. That is, a light source driver 34 that lights the light source 28 and a DMD driver 36 that drives the rotation of each of the micromirrors 32 of the DMD 30 are disposed as the headlight driver 20. The light source driver 34 lights the light source 28 and the DMD driver 36 controls the rotation of each of the micromirrors 32 of the DMD 30, so that it is possible to control the emission or non-emission of the light towards each of the divided regions 22 shown in FIG. 2.

It will be noted that in the present embodiment, the following description will be made assuming headlights that are disposed with the plural LED light sources 24. Further, the configuration of the headlights 12 is not limited to what has been described above. For example, the headlights may be disposed with plural shutters or the like that block the light that illuminates the front of the vehicle from a single light source, and the size of each shutter may be corresponded to the divided regions to enable lighting and extinguishment of each of the divided regions 22 shown in FIG. 2. Additionally, a spatial light modulating element such as a liquid crystal element other than the DMD 30 may also be used instead of the DMD 30.

Figures 4A, 4B:
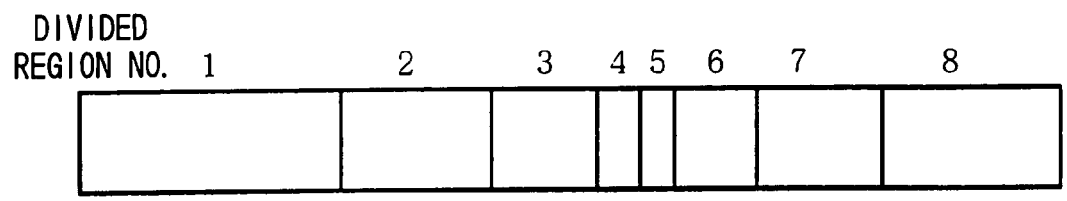
FIG. 4A is a diagram for describing the divided regions of the headlights of the vehicular illumination system pertaining to an embodiment of the present invention.
FIG. 4B is a diagram showing a light source divided region corresponding relationship table.

FIG. 4A is a diagram for describing the divided regions of the headlights 12 of the vehicular illumination system 10 pertaining to the embodiment of the present invention.

As shown in FIG. 4A, the divisional pattern of the divided regions of the headlights 12 of the present embodiment is set such that the divisional width of the divided region in the substantially center portion in the vehicle width direction is shorter in the vehicle width direction than at the vehicle width direction end portions and such that the divided regions gradually become longer in the vehicle width direction toward the outer sides in the vehicle width direction. It will be noted that the divisional pattern is not limited to this.

Further, in the headlights 12, the LED light sources 24 corresponding to each of the divided regions are preset, and the plural LED light sources 24 are selectively lighted to perform lighting and extinguishment of each of the divided regions.

For example, in the present embodiment, as shown in FIG. 4B, the LED light sources 24 that correspond to divided region No. 1 are LED light source Nos. 1 to 8, the LED light sources 24 that correspond to divided region no. 2 are LED light source Nos. 9 to 12, the LED light sources 24 that correspond to divided region No. 3 are LED light source Nos. 13 to 15, the LED light source 24 that corresponds to divided region No. 4 is LED light source No. 16, the LED light source 24 that corresponds to divided region No. 5 is LED light source No. 17, the LED light sources 24 that correspond to divided region No. 6 are LED light source Nos. 18 and 19, the LED light sources 24 that correspond to divided region No. 7 are LED light source Nos. 20 to 22, and the LED light sources 24 that correspond to divided region No. 8 are LED light source Nos. 23 to 27. Additionally, because it becomes possible to light and extinguish the light per each divided region by controlling the lighting and extinguishment of the LED light sources 24 corresponded to each of the divided regions, it becomes possible to light and extinguish the headlights 12 per each region by storing in advance, in the ROM 14C or the like, the correspondences shown in FIG. 4B as a light source divided region corresponding relationship table 38 and by the light distribution control ECU 14 using the light source divided region corresponding relationship table 38 to perform the lighting control.

It will be noted that in the present embodiment, the divided regions are determined by the number of the lighted ones of the LED light sources 24, but this constitutes no limitation. The sizes of the divided regions may also be determined by the size or characteristics of lenses and light sources, for example.

Next, the details of the light distribution control performed by the light distribution control ECU 14 of the vehicular illumination system 10 pertaining to the embodiment of the present invention will be described.

As mentioned above, the light distribution control performed by the light distribution control ECU 14 of the present invention includes the photographic image light distribution control and the predictive light distribution control.

In the photographic image light distribution control, the position of an oncoming vehicle is detected by detecting the bright point or the like of an oncoming vehicle from the photographed image obtained as a result of the camera 18 photographing the front of the vehicle, and thus the corresponding divided region is identified. Further, the headlight driver 20 is controlled such that light is not emitted towards the identified divided region. Thus, glare light towards an oncoming vehicle can be curbed even when traveling with high beams.

Further, in the predictive light distribution control of the present embodiment, when the detection result of the steering angle sensor 40 becomes equal to or greater than a predetermined steering angle, the relative displacement between the subject vehicle is predicted and the oncoming vehicle with the position immediately before the predetermined steering angle is exceeded as a reference, and the corresponding divided region is identified on the basis of the prediction result. Further, as in the photographic image light distribution control, the headlight driver 20 is controlled such that light is not emitted towards the identified divided region. It will be noted that although the position immediately before the predetermined steering angle is exceeded is used as the reference position here, the reference position is not limited to this, but the position in a straight-ahead driving state immediately before the predetermined steering angle is reached may also be used as the reference position.

Figure 5:
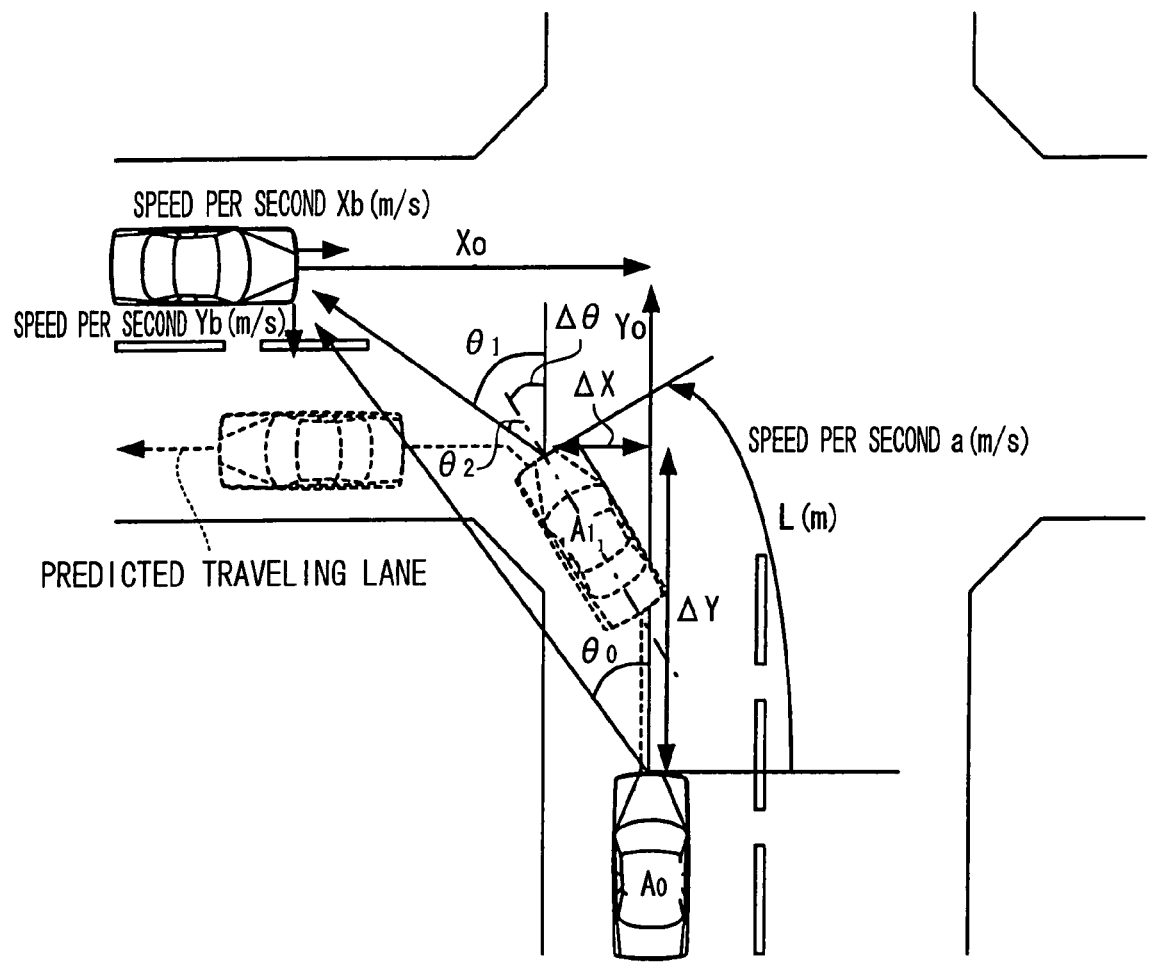
FIG. 5 is a diagram for describing predictive light distribution control.

For example, as shown in FIG. 5, assuming that direction Y represents the traveling direction of the subject vehicle and that direction X represents a direction perpendicular to the Y direction, a distance $X_0$ in the X direction from the oncoming vehicle to the intersection and vehicle speeds Xb and Yb of the oncoming vehicle in the X direction and the Y direction are acquired from the inter-vehicle communication device 42, and a distance $Y_0$ from the subject vehicle to the intersection and vehicle speed and time information are acquired from the navigation device 44. Further, a change in the vehicle angle with respect to the oncoming vehicle is predicted from these sets of information, and the divided region corresponding to the oncoming vehicle is identified on the basis of the predicted change in the subject vehicle angle, so that control is performed such that no light is emitted towards that region.

Figure 6A:
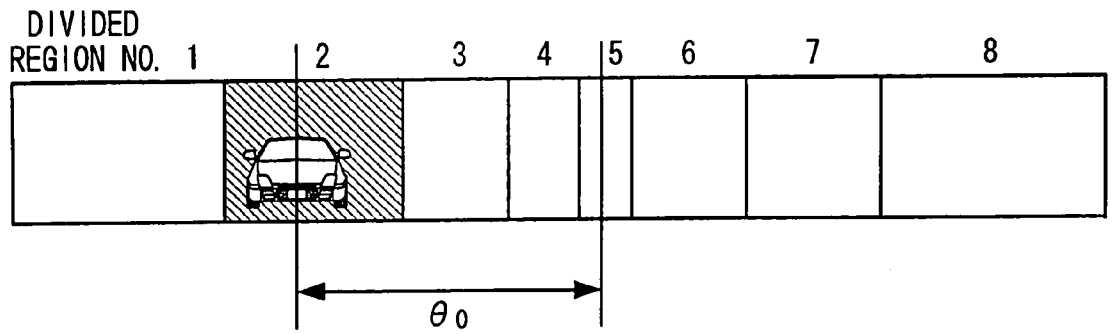
FIGS. 6A and 6B are diagrams for describing the identification of divided regions in which an oncoming vehicle is present in the predictive light distribution control.

Specifically, at position $A_0$ and time $t_0$ (reference position) when the intersection is entered shown in FIG. 5, the position of the oncoming vehicle is located in a divided region corresponding to angle $\theta_0$ with respect to the traveling direction of the subject vehicle, and as shown in FIG. 6A, the LED light sources 24 corresponding to that divided region are extinguished. At this time, the extinguishment position becomes angle $\theta_0$ and can be determined from expression (1) shown below. It will be noted that $\theta_0$ is negative in the vehicle left side direction is negative and positive in the vehicle right side direction with the vehicle center position as a reference.

$$\theta_0 = -\tan^{-1}(X_0/Y_0) \qquad (1)$$

Figure 6B:
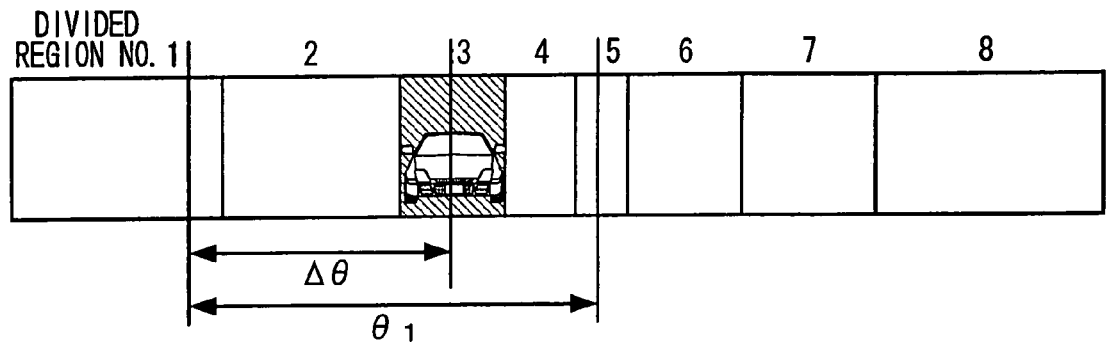

Further, at position $A_1$ and time $t_0+L/a$ when the intersection is being entered as shown in FIG. 5, the position of the oncoming vehicle becomes angle $\theta_1$ with respect to the Y direction while it becomes $\theta_2=\Delta\theta-\theta_1$ when converted to angle $\theta_2$ with respect to the traveling direction of the subject vehicle, and as shown in FIG. 6B, the LED light sources 24 corresponding to that divided region are extinguished. At this time, the extinguishment position becomes angle $\theta_2$ and can be determined from expression (2) shown below.

$$\theta_2 = \Delta\theta - \tan^{-1}((X_0-\Delta X-XbL/a)/(Y_0-\Delta Y-YbL/a)) \qquad (2)$$

In the present embodiment, the light distribution control ECU 14 is configured to acquire the vehicle speed and time information of the subject vehicle from the navigation device 44, but this constitutes no limitation. The light distribution control ECU 14 may also be configured to acquire the vehicle speed from a vehicle speed sensor and acquire the time information or the like from an audio device or the like, for example.

Figure 7:
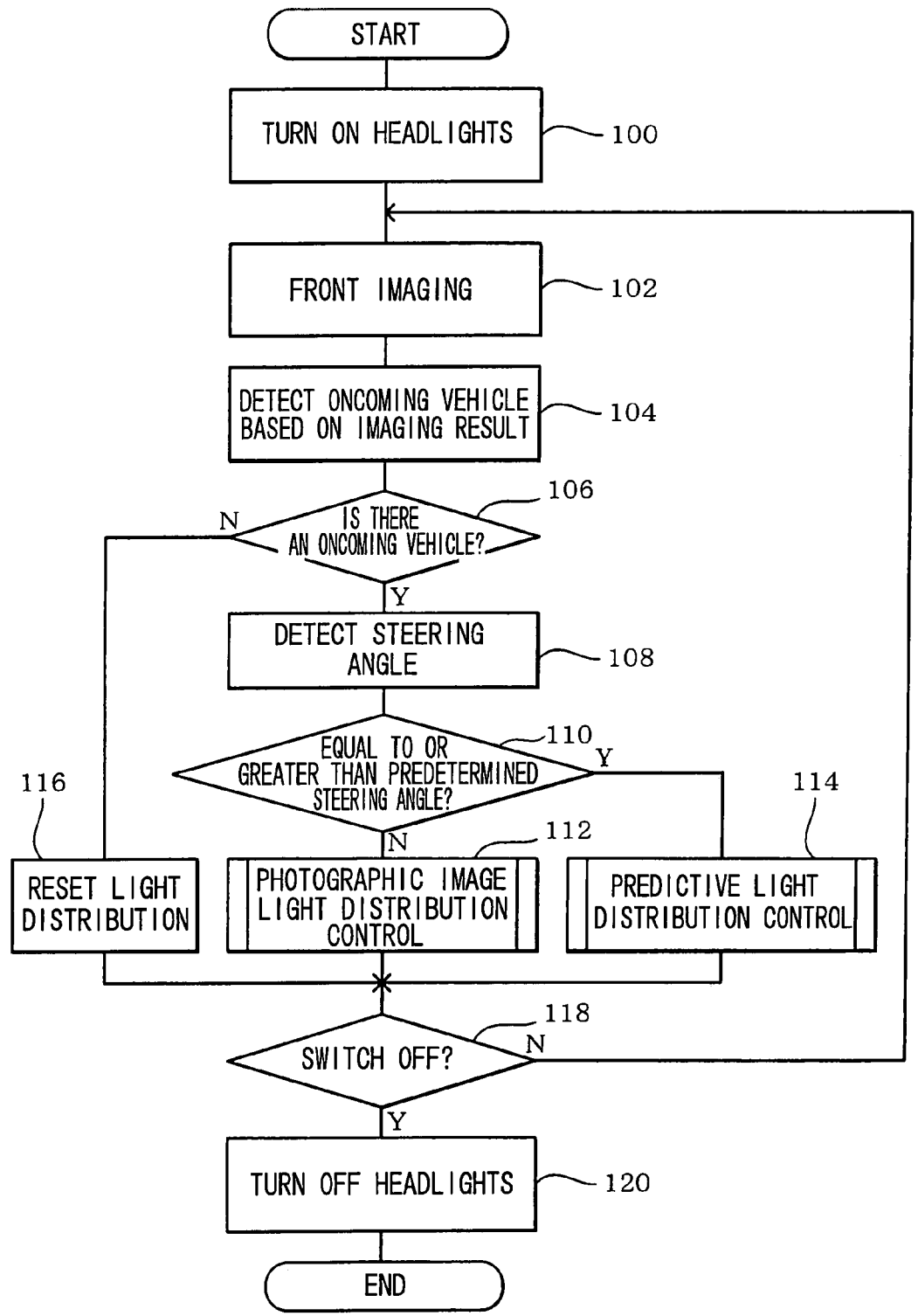
FIG. 7 is a flowchart showing an example of a light distribution control routine performed by a light distribution control ECU of the vehicular illumination system pertaining to an embodiment of the present invention.

FIG. 7 is a flowchart showing an example of a light distribution control routine performed by the light distribution control ECU 14 of the vehicular illumination system 10 pertaining to the embodiment of the present invention. It will be noted that this routine starts when lighting of the headlights 12 is instructed as a result of a passenger operating the switch 16. Further, when the switch 16 is disposed with an automatic lighting mode, then the routine may start when automatic lighting is instructed by a passenger and a predetermined condition for lighting the headlights 12 is satisfied.

When lighting of the headlights 12 is instructed as a result of a passenger operating the switch 16, then the headlights 12 are lighted in step 100. That is, the CPU 14A controls the headlight driver 20 via the I/O 14D, whereby each of the LED light sources 24 of the two headlights 12 is driven to cause the headlights 12 to light.

In step 102, the light distribution control ECU 14 acquires, via the I/O 14D, the photographed result where the front of the vehicle has been photographed by the camera 18, and then the routine moves to step 104.

In step 104, an oncoming vehicle is detected by the CPU 14A on the basis of the photographed result of the camera 18, and then the routine moves to step 106. It will be noted that the oncoming vehicle may be detected using various known technologies. For example, the oncoming vehicle may be detected by performing processing such as using image processing to detect the bright point.

Next, in step 106, it is determined by the CPU 14A whether or not an oncoming vehicle is present in front. When the determination is YES, then the routine moves to step 108. When the determination is NO, then the routine moves to step 116.

In step 108, the steering angle is detected, and then the routine moves to step 110. That is, the light distribution control ECU 14 acquires, via the I/O 14D, the steering angle detected by the steering angle sensor 40.

In step 110, it is determined whether or not the detected steering angle is equal to or greater than the predetermined steering angle. When the determination is NO, then the routine moves to step 112. When the determination is YES, then the routine moves to step 114. It will be noted that the predetermined steering angle is a steering angle that has been determined beforehand in accordance with the processing capability of the CPU 14A of the light distribution control ECU 14—that is, the processing speed at which the CPU 14A image-processes the photographed image.

In step 112, the photographic image light distribution control (detailed processing will be described later) is performed by the light distribution control ECU 14, and then the routine moves to step 118. In step 114, the predictive light distribution control (detailed processing will be described later) is performed by the ECU 14, and then the routine moves to step 118.

In step 116, the light distribution is reset. That is, because there are instances where the light distribution control is performed and the respective divided regions are in an extinguished state, all the divided regions are lighted by resetting the light distribution control, and then the routine moves to step 118.

Then, in step 118, it is determined by the CPU 14A whether or not the switch 16 has been switched OFF. When the determination is NO, then the routine returns to step 102 and the aforementioned processing is repeated. When the determination in step 118 is YES, then the routine moves to step 120, and the headlights 12 are extinguished so that the processing sequence is ended.

Figure 8:
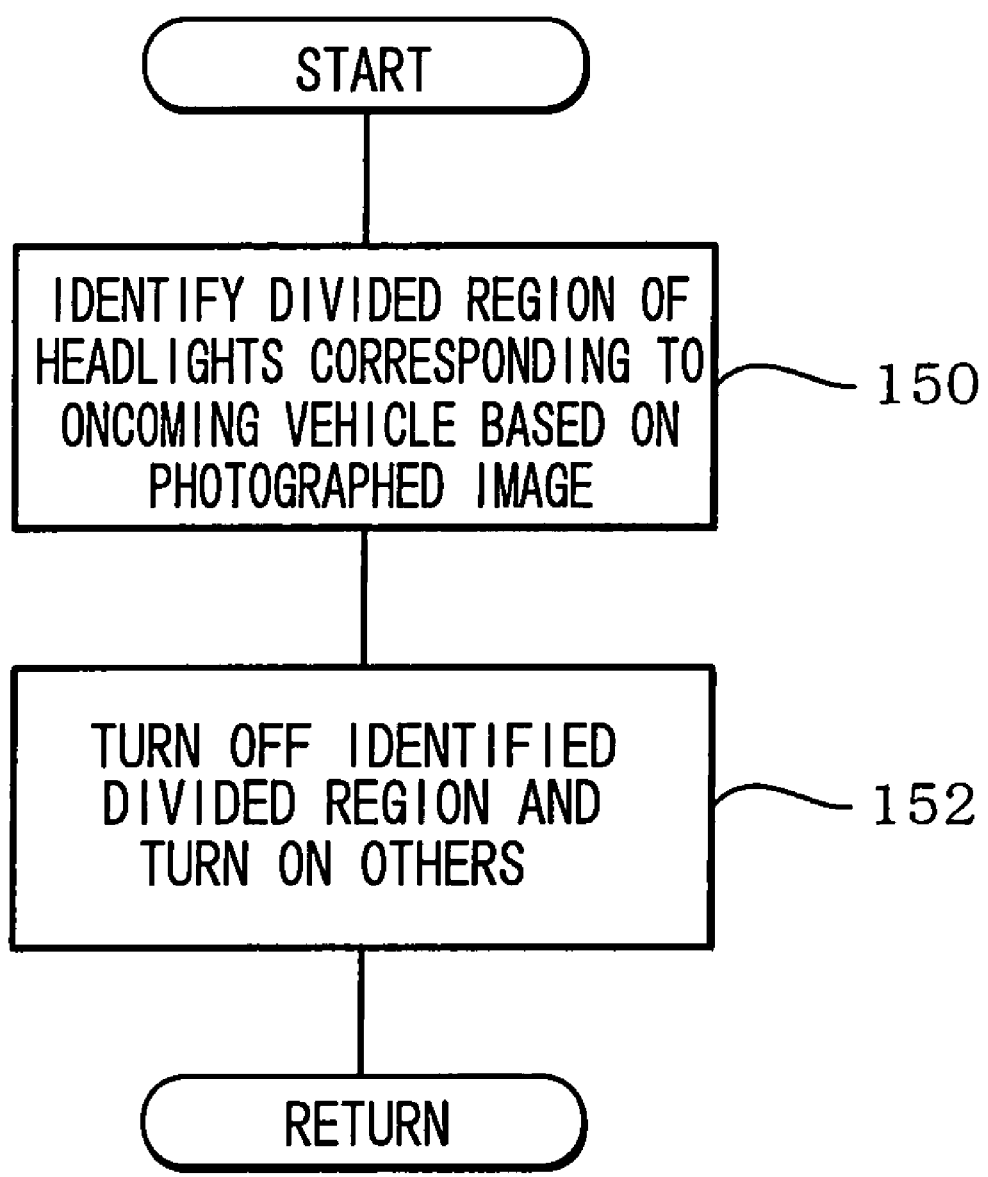
FIG. 8 is a flowchart showing an example of the flow of photographic image light distribution control performed by the light distribution control ECU of the vehicular illumination system pertaining to an embodiment of the present invention.

Next, the detailed processing flow of the aforementioned photographic image light distribution control will be described. FIG. 8 is a flowchart showing an example of the flow of the photographic image light distribution control performed by the light distribution control ECU 14 of the vehicular illumination system 10 pertaining to the embodiment of the present invention.

When the light distribution control routine moves to the photographic image light distribution control, first, in step 150, the divided region corresponding to the oncoming vehicle is identified by the CPU 14A on the basis of the photographed image, and then the flow moves to step 152.

Then, in step 152, the identified divided region is extinguished, the other divided regions are lighted, and then the flow moves to aforementioned step 116. That is, because the divided region corresponding to the oncoming vehicle is extinguished as a result of the light distribution control ECU 14 controlling the headlight driver 20, glare light towards the oncoming vehicle can be curbed even when traveling with high beams.

Figure 9:
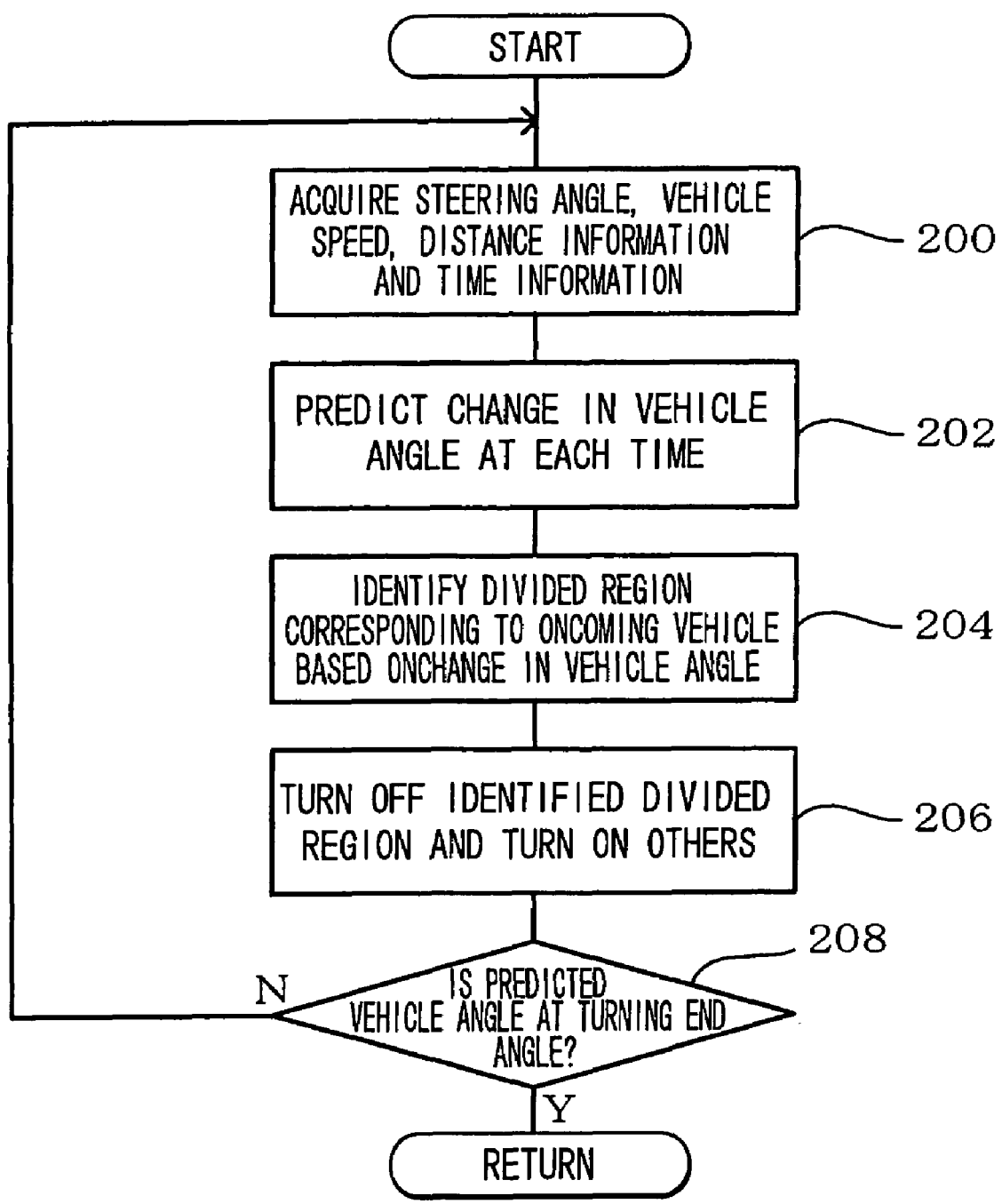
FIG. 9 is a flowchart showing an example of the flow of the predictive light distribution control performed by the light distribution control ECU of the vehicular illumination system pertaining to an embodiment of the present invention.

Next, the detailed processing flow of the aforementioned predictive light distribution control will be described. FIG. 9 is a flowchart showing an example of the flow of the predictive light distribution control performed by the light distribution control ECU 14 of the vehicular illumination system 10 pertaining to the embodiment of the present invention.

When the light distribution control routine moves to the predictive light distribution control, first, in step 200, the steering angle detected by the steering angle sensor 40 is acquired by the light distribution control ECU 14, the vehicle speed and distance information are acquired from the navigation device 44 by the light distribution control ECU 14, and then the flow moves to step 202.

In step 202, the change in the vehicle angle at each time is predicted by the light distribution control ECU 14, and then the flow moves to step 204. Prediction of the change in the vehicle angle can be obtained by using aforementioned expression (1) or expression (2).

In step 204, the divided region corresponding to the oncoming vehicle is identified by the light distribution control ECU 14 on the basis of the change in the vehicle angle, and then the flow moves to step 206. That is, the light distribution control ECU 14 predicts the moving destination of the divided region corresponding to the divided region in which the oncoming vehicle is present by identifying the divided region to which the vehicle has moved from the current divided region a distance equal to the change in the vehicle angle.

In step 206, the identified divided region is extinguished, and the other divided regions are lighted. Then, the flow moves to step 208. That is, because the divided region corresponding to the oncoming vehicle is extinguished as a result of the light distribution control ECU 14 controlling the headlight driver 20, glare light towards the oncoming vehicle can be curbed even when traveling with high beams. Further, because the light distribution control is performed by predicting the moving destination of the divided region corresponding to the oncoming vehicle on the basis of the information acquired from the inter-vehicle communication device 42 and the navigation device 44, image processing and the like with respect to the photographed image becomes unnecessary and the processing load of the light distribution control ECU 14 can be reduced, whereby control delay can be curbed.

In step 208, it is determined by the light distribution control ECU 14 whether or not the predicted vehicle angle has become a turning end angle. This is done by determining whether or not the predicted vehicle angle has reached the intersection angle at the intersection that is discerned from map information acquired from the navigation device 44. When the determination is NO, then the flow returns to step 200 and the aforementioned processing is repeated. When the determination is YES, then the flow moves to aforementioned step 118. In the present embodiment, the processing of the predictive light distribution control is returned when the predicted vehicle angle becomes the turning end angle, but this constitutes no limitation. A configuration is also possible in which the determination in step 208 is omitted and the processing of the predictive light distribution control is directly returned as it is and the flow moves to aforementioned step 118. In this case, the routine moves to the photographic image light distribution control when the steering angle becomes less than a predetermined angle. That is, when the steering angle becomes smaller, control delay no longer occurs even if the photographic image light distribution control is performed, and thus when the steering angle becomes smaller than the predetermined steering angle, the photographic image light distribution control is performed.

As will be appreciated, the present embodiment is disposed with plural types of light distribution control (the photographic image light distribution control and the predictive light distribution control) whose processing loads are different and performs the predictive light distribution control, whose processing load is small, when the processing load becomes equal to or greater than a predetermined processing load, such as when the steering angle becomes equal to or greater than a predetermined steering angle, so that the processing load can be reduced and control delay can be curbed. Consequently, the light distribution control can be reliably performed so as to suppress glare light towards an oncoming vehicle without creating adverse effects such as control delay.

Next, modification examples of the vehicular illumination system pertaining to the embodiment of the present invention will be described.

FIRST MODIFICATION EXAMPLE

Figure 10:
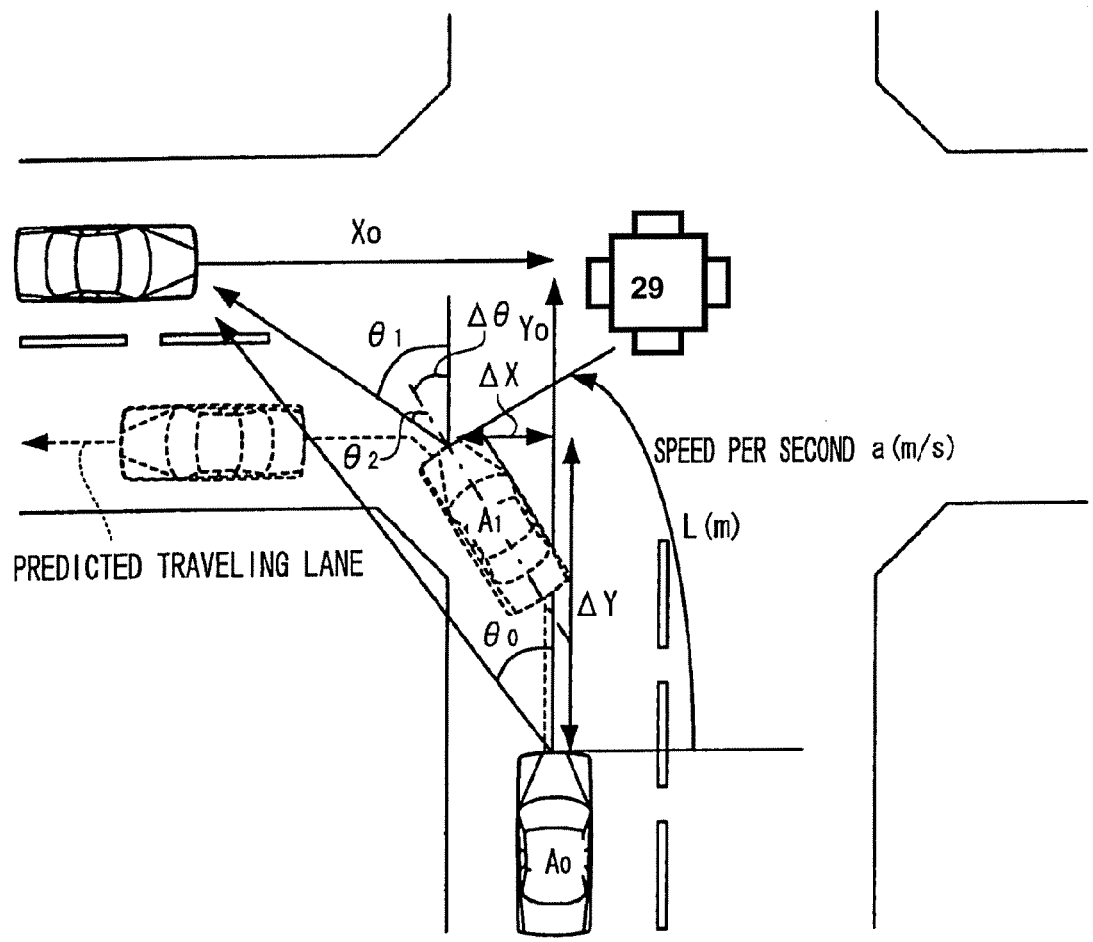
FIG. 10 is a diagram for describing predictive light distribution control of a first modification.

In the above-described embodiment, when the predictive light distribution control is performed, a change in the vehicle angle is predicted in consideration of an oncoming vehicle entering an intersection from a direction intersecting the traveling direction of the subject vehicle is traveling. As shown in FIG. 10, when a traffic signal 29 at the intersection is red, and when the subject vehicle is traveling, the oncoming vehicle in the direction intersecting the traveling direction of the subject vehicle is stopped at the red traffic signal 29, so that when a change in the vehicle angle is predicted, parameters relating to the movement of the oncoming vehicle can be decreased in comparison to when the oncoming vehicle is traveling.

In a first modification example, the predictive light distribution control is performed in consideration of a case where an oncoming vehicle side traffic signal at an intersection is red and the oncoming vehicle is stopped at the traffic signal. Thus, when the oncoming vehicle is stopped, calculation parameters when a change in the vehicle angle is predicted are decreased so that the processing load can be further alleviated.

In the first modification example, the configuration per se of the vehicular illumination system is similar to that of the preceding embodiment, and therefore detailed description thereof will be omitted.

Determination as to whether or not an oncoming vehicle is stopped is carried out in a manner such that the light distribution control ECU 14 acquires information about the intersection from the navigation device 44, and when the subject vehicle is traveling at that intersection, the light distribution control ECU 14 determines that the oncoming vehicle in the direction intersecting the traveling direction of the subject vehicle is stopped at a red traffic signal. Then, the light distribution control ECU 14 predicts the change in the vehicle angle based on the determination result. The prediction of the change in the vehicle angle is performed in a manner similar to that in the preceding embodiment.

Figure 11A:
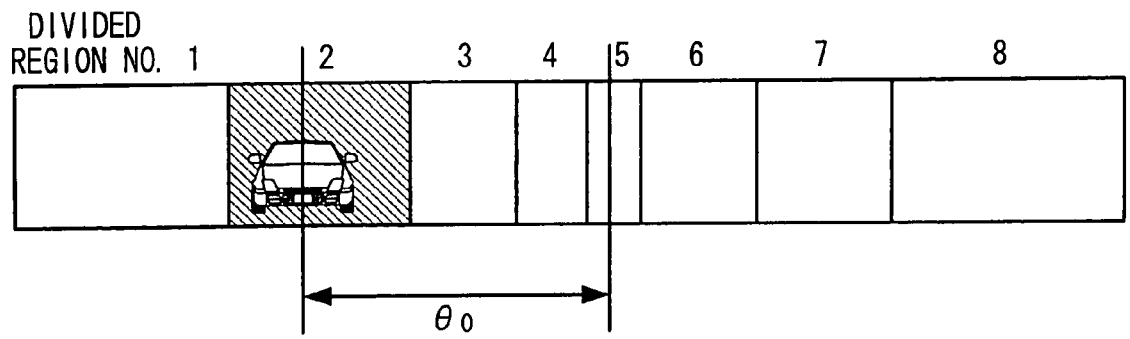
FIGS. 11A and 11B are diagrams for describing the identification of divided regions in which an oncoming vehicle is present in the predictive light distribution control of the first modification.

For example, at position $A_0$ and time $t_0$ (reference position) when the subject vehicle is entering the intersection shown in FIG. 10, the position of the oncoming vehicle is located in a divided region corresponding to angle $\theta_0$ with respect to the traveling direction of the subject vehicle, and as shown in FIG. 11A, the LED light sources 24 corresponding to that divided region are extinguished. At this time, the extinguishment position becomes angle $\theta_0$ and can be determined from the below given expression. It will be noted that $\theta_0$ is negative in the vehicle left side direction and positive in the vehicle right side direction, with the vehicle center position as a reference.

$$\theta_0 = -\tan^{-1}(X_0/Y_0)$$

Figure 11B:
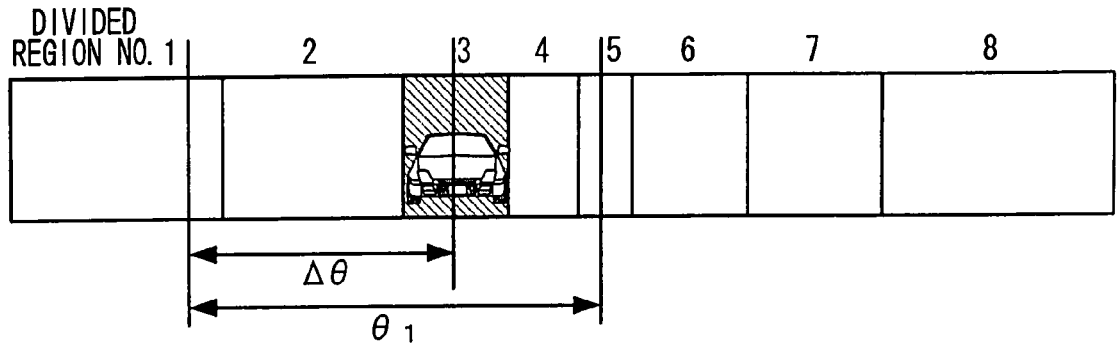

Further, at position $A_1$ and time $t_0 + a/L$ when the subject vehicle is entering the intersection shown in FIG. 10, as in the preceding embodiment, the position of the oncoming vehicle becomes $\theta_1$ with respect to the Y direction but becomes $\theta_2 = \Delta\theta - \theta_1$ when converted to angle $\theta_2$ with respect to the traveling direction of the subject vehicle, so that the LED light sources 24 corresponding to that divided region are extinguished, as shown in FIG. 11B. At this time, the extinguishment position becomes angle $\theta_2$ and can be determined from the below given expression.

$$\theta_2 = \Delta\theta - \tan^{-1}((X_0 - \Delta X)/(Y_0 - \Delta Y))$$

That is, since the oncoming vehicle is stopped, parameters that are used in the calculation are decreased in comparison to the expression (2) used in the preceding embodiment and thus the processing load can be reduced.

SECOND MODIFICATION EXAMPLE

In the preceding embodiment, when the predictive light distribution control is performed, the vehicle angle is predicted assuming a case where the angle formed between the traveling direction of the subject vehicle and the traveling direction of an oncoming vehicle is arbitrary, but in the case of an orthogonal intersection, that is, when the traveling direction of the subject vehicle and the traveling direction of an oncoming vehicle are orthogonal to each other, there is no need that the parameters relating to the movement of the oncoming vehicle be divided into the X and Y-axis directions when predicting the change in the vehicle angle, and consequently the calculation parameters can be reduced in comparison to the preceding embodiment.

In a second modification example, the predictive light distribution control is performed in consideration of when the traveling direction of the subject vehicle and the traveling direction of an oncoming vehicle are orthogonal to each other. Thus, when the traveling direction of the subject vehicle and the traveling direction of an oncoming vehicle are orthogonal, calculation parameters when a change in the vehicle angle is predicted are decreased so that the processing load can be further alleviated.

In the second modification example, the configuration per se of the vehicular illumination system is similar to that of the preceding embodiment, and therefore detailed description thereof will be omitted.

Determination as to whether or not the traveling direction of the subject vehicle and the traveling direction of an oncoming vehicle are orthogonal is carried out in a manner such that the light distribution control ECU 14 acquires information about the intersection from the navigation device 44, and determines, from the information about the intersection, whether or not the traveling direction of the subject vehicle and the traveling direction of the oncoming vehicle are orthogonal. Further, a change in the vehicle angle is predicted based on the determination result. The prediction of the change in the vehicle angle is performed in a manner similar to that in the preceding embodiment.

Figure 12:
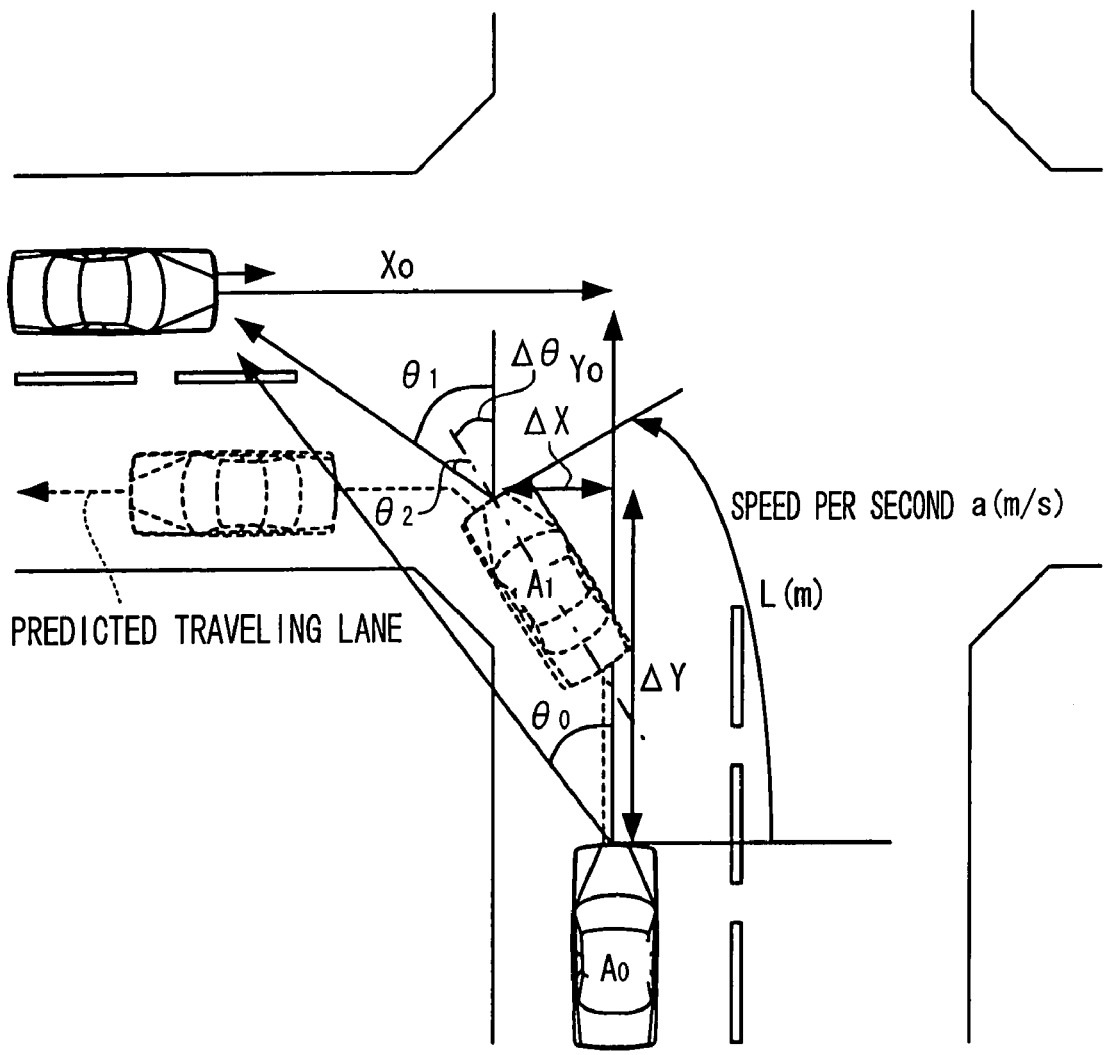
FIG. 12 is a diagram for describing predictive light distribution control of a second modification.
Figure 13A:
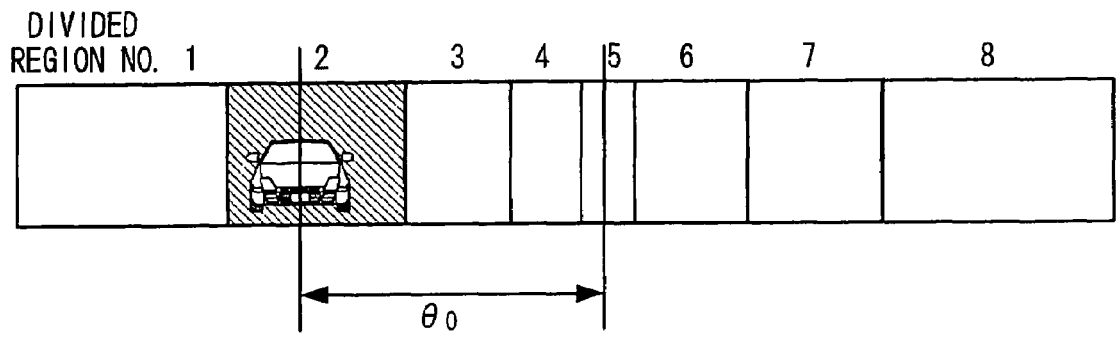
FIGS. 13A and 13B are diagrams for describing the identification of divided regions in which an oncoming vehicle is present in the predictive light distribution control of the second modification.

For example, at position $A_0$ and time $t_0$ (reference position) when the subject vehicle is entering an intersection shown in FIG. 12, the position of the oncoming vehicle is located in a divided region corresponding to angle $\theta_0$ with respect to the traveling direction of the subject vehicle, and as shown in FIG. 13A, the LED light sources 24 corresponding to that divided region are extinguished. At this time, the extinguishment position becomes angle $\theta_0$ and can be determined from the below given expression. It will be noted that the angle $\theta_0$ is negative in the vehicle left side direction and positive in the vehicle right side direction, with the vehicle center position as a reference.

$$\theta_0 = -\tan^{-1}(X_0/Y_0)$$

Figure 13B:
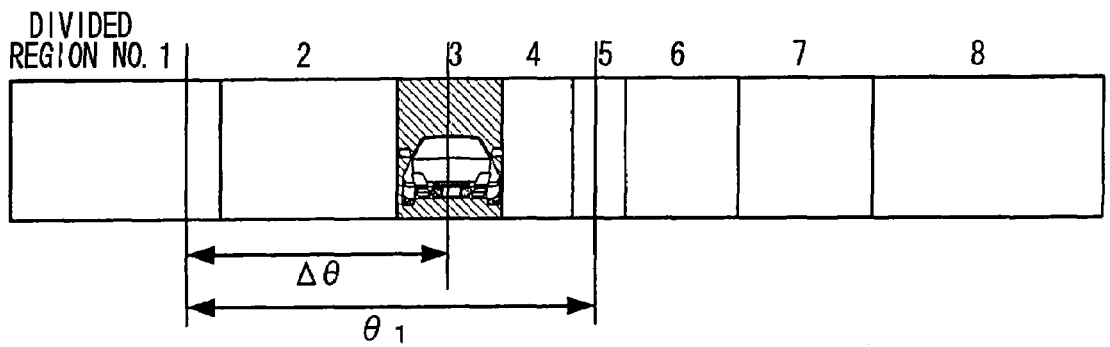

Further, at position $A_1$ and time $t_0 + a/L$ when the intersection is being entered as shown in FIG. 12, the position of the oncoming vehicle becomes, as in the preceding embodiment, $\theta_1$ with respect to the Y direction, and when the angle is converted to angle $\theta_2$ with respect to the traveling direction of the subject vehicle, an equation $\theta_2 = \Delta\theta - \theta_1$ holds true. Thus, as shown in FIG. 13B, the LED light sources 24 corresponding to that divided region are extinguished. The extinguishment position becomes angle $\theta_2$ and can be determined from the following expression:

$$\theta_2 = \Delta\theta - \tan^{-1}((X_0 - \Delta X - bL/a)/(Y_0 - \Delta Y))$$

That is, calculation parameters relating to the X direction and Y direction components of the oncoming vehicle are decreased with respect to those in expression (2) used in the preceding embodiment, so that the processing load can be reduced.

Although in the preceding embodiment and the modification examples thereof, the steering angle is used as information representing the processing load when processing is performed to control the light distribution to serve as a condition for determining the processing load, this constitutes no limitation. Since the processing load of the light distribution control increases and decreases depending on the number of oncoming vehicles that become illumination targets and the road environment such as the road shape, it is possible that at least one of the above information items may be applied as the information representing the processing load to serves as the condition for determining the processing load. It is also possible that the relative speed between the subject vehicle and a non-subject vehicle, the distance between them, the relative angular displacement per unit time of the non-subject vehicle with respect to the subject vehicle, or the like may be applied as information representing the processing load to serve as the condition for determining the processing load. Further, information representing the relative displacement quantity, relative speed, or the like of the non-subject vehicle in the width direction of the subject vehicle may be applied as another condition for determining the processing load.

Further, although in the preceding embodiment and modification examples thereof, the camera 18 is used as a detection unit to detect an oncoming vehicle as an illumination target, this constitutes no limitation. For example, a detection unit such as a radar may be used.

Further, although in the preceding embodiment and modification examples, the photographic image light distribution control is performed until the steering angle reaches the predetermined angle, and when the steering angle becomes equal to or greater than the predetermined angle, the predictive light distribution control whose processing load is lower than that of the photographic image light distribution control is performed, this constitutes no limitation. For example, it is possible that the above-mentioned processing in step 114 may be omitted such that the photographic image light distribution control is prohibited when the steering angle becomes equal to or greater than the predetermined angle, whereby unnecessary control due to processing delay of the photographic image light distribution control is curbed. Alternatively, instead of the predictive light distribution control in which high beams are always lighted, low-beam light distribution control in which high beams are switched to low beams which require no light distribution control may be provided, thereby ensuring the minimum necessary illumination. Further, although in the preceding embodiment and modification examples, two types of light distribution control, i.e., the photographic image light distribution control and the predictive light distribution control are given as examples of light distribution control representing different processing loads, this constitutes no limitation. For example, it is possible that three types of light distribution control representing different processing loads may be provided, which include the aforementioned photographic image light distribution control in which the light distribution is controlled with respect to all the light distribution regions of the headlights 12, partial photographic image light distribution control in which the light distribution is controlled only with respect to part of the light distribution regions of the headlights 12 (e.g., light distribution control in which only a predetermined region of the center portion of the photographed image is image-processed to detect the oncoming vehicle and identify the divided region corresponding to the oncoming vehicle and light distribution control is performed with respect to only the vehicle's center region, whereby the processing load is reduced than in photographic image light distribution control), and processing in which the light distribution control is ended and only low-beam lighting provided (light distribution control in which light distribution control is prohibited and the processing load is reduced than in the partial photographic image light distribution control), so that the light distribution control is selected depending on increase and decrease in the processing load.

Alternatively, other types of light distribution control representing different processing loads may be provided so that the light distribution control may be selected depending on the processing load.

Further, although in the preceding embodiment, no reference is made to the number of oncoming vehicles, it is possible that switching may be made between the photographic image light distribution control and the predictive light distribution, depending on the number of detected oncoming vehicles. For example, it is possible that when, while performing the predictive light distribution control by detecting a first oncoming vehicle, a second oncoming vehicle is detected, the photographic image light distribution control may be performed with respect to the second oncoming vehicle, or alternatively control may be performed such that the photographic image light distribution control is returned with respect to both of the two vehicles. Control may be performed such that: when three oncoming vehicles are detected in order, the predictive light distribution control is performed with respect to the first oncoming vehicle; when the second vehicle is detected, the photographic image light distribution control is performed with respect to the second oncoming vehicle; and when the third oncoming vehicle is detected, the photographic image light distribution control is returned with respect to the three vehicles. Further, it is also possible that control may be combined in which the photographic image light distribution control is prohibited so that the lighting is changed to low-beam lighting. In this case, the respective types of light distribution control are appropriately combined depending on the processing load.

Further, although in the preceding embodiment, description is given of the case where the illustration target is an oncoming vehicle by way of example, the illumination target for which light distribution is controlled is not limited to an oncoming vehicle; for example, the illumination target may be a pedestrian or the like.

What is claimed is:

1. A vehicular illumination system comprising:
    a vehicular illumination unit whose light distribution is changeable;
    a detection unit that detects an illumination target with respect to which the light distribution of the vehicular illumination unit is controlled;
    an acquisition unit that acquires a steering angle of a subject vehicle; and
    a control unit that is capable of at least two types of light distribution control, in each of which the processing load of computation is different and the light distribution control includes a predictive light distribution control that predicts the relative displacement between the subject vehicle and the illumination target with a detection result of the detection unit as a reference and controls the light distribution of the vehicular illumination unit based on a prediction result, and that controls the light distribution of the vehicular illumination unit by selecting a light distribution control having a small processing load when the steering angle acquired by the acquisition unit is equal to or greater than a predetermined steering angle.

2. The vehicular illumination system of claim 1 wherein:
    the detection unit detects a non-subject vehicle as the illumination target; and
    the predictive light distribution control determines, based on the detection result of the detection unit and an acquisition result of an information acquisition unit that acquires map information and a traveling status of the subject vehicle, right/left turning of the subject vehicle into an intersection where a traffic signal exists, the presence of a non-subject vehicle ahead of the subject vehicle turning right/left, and the status of the traffic signal facing the subject vehicle, and predicts the relative displacement, with the moving displacement of the non-subject vehicle as 0, when the traffic signal facing the subject vehicle allows the subject vehicle to advance.

3. The vehicular illumination system of claim 1, wherein the detection unit detects a non-subject vehicle as the illumination target, and
    the predictive light distribution control predicts the relative displacement based on the detection result of the detection unit and an acquisition result of an information acquisition unit that acquires map information including road shape.

4. The vehicular illumination system of claim 1, wherein:
    the vehicular illumination unit is configured such that light distribution can be changed for each divided region of a plurally divided light distribution region; and
    the light distribution control processing controls the light distribution of the vehicular illumination unit such that light emitted towards the divided region corresponding to the illumination target detected by the detection unit is non-emitted or dimmed.

5. The vehicular illumination system according to claim 1, wherein the control unit is capable of two types of light distribution control, including:

a photographic image light distribution control in which the illumination target is detected by the detection unit and the light distribution of the vehicular illumination unit with respect to the detected illumination target is controlled; and the predictive light distribution control in which the processing load is smaller than the photographic image light distribution control; and when the steering angle acquired by the acquisition unit is equal to or greater than a predetermined value, the control unit selects the predictive light distribution control to control the light distribution of the vehicular illumination unit.

* * * * *